3,223,683
CROSS-LINKED POLY- AND INTERPOLY-
(AMIDE-ACETALS)
Everett H. Pryde, Peoria, Ill., assignor to the United States of America as represented by the Secretary of Agriculture
No Drawing. Filed Apr. 14, 1961, Ser. No. 103,175
4 Claims. (Cl. 260—78)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the preparation of novel linear poly(amide-acetal) and interpoly(amide-acetal) polymers in which both amide and acetal linkages are integral parts of the polymer backbone, which linear polymers can be crosslinked by heating in the presence of a catalyst such as para-toluenesulfonic acid or certain metal oxides or acid salts to yield infusible, insoluble, and transparent products that are exceptionally adherent to glass.

In copending application, S.N. 72,532, filed November 29, 1960, now abandoned, of which this is a continuation-in-part, I have disclosed the preparation of novel linear poly(ester-acetals) formed by condensing the pentaerythritol acetal of methyl azelaaldehydate with ethylene glycol under alkaline conditions, and that these linear poly(ester-acetals) may then be crosslinked by heating in the presence of certain acidic catalysts to yield insoluble, transparent polymers that are extraordinarily adherent to glass and thus have marked utility for the laminating of glass.

In the present invention I have now further discovered that the aforesaid pentaerythritol acetal of methyl azelaaldehydate as well as the pentaerythritol acetal of azelaic semialdehyde undergo condensation polymerizations with diamines such as hexamethylene diamine or ethylene diamine to give novel linear poly(amide-acetals) that can be readily crosslinked by heating in the presence of a catalyst such as para-toluenesulfonic acid or a metal oxide or acid salt to yield polymers that are infusible, are insoluble even in organic solvents such as benzene or a 50 percent solution of phenol in tetrachloroethane, and are exceptionally adherent to glass, and thus exhibit the same glass-bonding utility possessed by the poly(ester-acetals) of my aforesaid copending application. I have also found that by replacing part of the pentaerythritol acetal of methyl azelaaldehydate or that of azelaic semialdehyde by another dibasic ester such as dimethyl azelate or dimethyl terephthalate or a mixture thereof, analogous interpoly(amide-acetals) having the same utility are obtained.

The principal object of ths invention, therefore, is the preparation of novel linear poly(amide-acetals) that may then be catalytically crosslinked to form highly useful adhesives for glass. Another object is the preparation of novel linear interpoly(amide-acetals) that may be cross-linked in the same manner to yield products having similar adhesive properties. Other objects of the invention will become apparent to one skilled in the art.

The 3,9-dicarboxyalkyl acids of 2,4,8,10-tetraspiro-[5,5] undecane are known (Clements, et al., Jour. Org. Chem., 24, 1958 (1959)). A specific number of the group is the compound 3,9-bis(7-carboxyheptyl)-2,4,8,10-tetraoxaspiro[5,5]undecane, which compond is obtained by first reacting pentaerythritol with methyl azelaaldehydate dimethyl acetal (from the ozonolysis of methyl oleate; Pryde, et al., Jour. Org. Chem., 25: 618 (1960)) to obtain the dimethyl ester, namely, 3,9-bis(7-carbomethoxyheptyl)-2,4,8,10-tetraoxaspiro[5,5]undecane, as fully set forth in Example 1. This compound, which may also be described as the pentaerythritol acetal of methyl azelaaldehydate, may then be saponified in conventional manner as shown in Example 2 to yield the free dibasic acid, which may also be described as the pentaerythritol acetal of azelaic semialdehyde.

$$*ROOC(CH_2)_7\overset{H}{\underset{H}{C}}\begin{matrix}O-\overset{H}{C}&\overset{H}{C}-O\\H&H\end{matrix}C\begin{matrix}H&H\\O-\overset{H}{C}&\overset{H}{C}-O\end{matrix}\overset{H}{\underset{H}{C}}(CH_2)_7COOR*$$

*(R=H: 3,9 - bis(7 - carboxyheptyl)-2,4,8,10-tetraoxaspiro-[5,5]undecane.
*(R=CH₃: 3,9-bis(7-carbomethoxyheptyl) - 2,4,8,10 - tetraspiro[5,5]undecane.

Preparation of the linear poly(amide-acetal) compounds that may be represented as containing the following repeating unit structure $$[-\overset{O}{\underset{\parallel}{C}}(CH_2)_7\overset{H}{\underset{H}{C}}\begin{matrix}O-\overset{H}{C}&\overset{H}{C}-O\\H&H\end{matrix}C\begin{matrix}H&H\\O-\overset{H}{C}&\overset{H}{C}-O\end{matrix}\overset{H}{\underset{H}{C}}\cdot(CH_2)_7\overset{O}{\underset{\parallel}{C}}NH\cdot(CH_2)_6NH-]_n$$

where $n$ is an integer having a value of 3–6 was carried out by reacting a diamine such as hexamethylene diamine or ethylene diamine with either the pentaerythritol acetal of azelaic semialdehyde (via the rather unstable hexamethylene diammonium salt) or with the corresponding dimethyl ester. In the first of the above alternatives, the loss of diamine on standing necessitated adding replacement diamine to prevent premature crosslinking, and the product was a brittle white solid melting at about 160° C. and having a molecular weight of only about 1,600. However, when equimolar quantities of hexamethylene diamine and the said dimethyl ester were reacted, the resulting polymer had a molecular weight of 3,000, corresponding to 6 repeating units.

A linear interpoly(amide-acetal) product formed by reacting a mixture of 3,9-bis(7-carbomethoxyheptyl)-2, 4,8,10-tetraoxaspiro[5,5]undecane (i.e., the pentaerythritol acetal of methyl azelaaldehydate) and dimethyl azelate with ethylene diamine melted at 232–235° C. and gelled quickly upon heating with p-toluenesulfonic acid.

The following examples illustrate the specific conduct of my invention.

EXAMPLE 1

The pentaerythritol acetal of methyl azelaaldehydate, i.e., 3,9-bis(7-carbomethoxyheptyl)-2,4,8,10-tetraoxaspiro [5,5]undecane was prepared by placing 100.7 g. (0.348 mole) of methyl azelaaldehyde dimethyl acetal of 80.2 percent purity, 29.3 g. (0.215 mole) of pentaerythritol, and 0.1 g. of potassium acid sulfate in a 3-necked, 500 ml., round-bottomed flask fitted with a thermometer, a capillary tube for nitrogen, and a 4-in. Vigreux column and distilling head. The flask and contents were heated at a pot temperature of 127°–134° C. for 5 hours, during which period 19.0 g. of methanol distilled off and was collected. Toluene (100 ml.) was added, and heating was continued for 3 hours with slow distillation of the toluene until the pot temperature reached 142° C. and the vapor temperature was 105° C. After cooling, the solidified reaction mass was dissolved in 150 ml. methylene chloride. The solution was filtered to remove unreacted pentaerythritol (4.33 g.) and washed with water. After removal of solvent, the product was distilled at reduced pressure to give 75.4 g. of material boiling at 241°–260° C. at 0.35 mm. pressure. Recrystallization from absolute ethanol gave 69.9 g. (85 percent of theory) of crystals melting at 65°–67° C.

*Analysis.*—Calcd. for $C_{25}H_{44}O_8$: C, 63.53; H, 9.38; sapon. equiv. 236.3. Found: C, 63.54; H, 9.23; sapon. equiv. 236.7.

EXAMPLE 2

To prepare the pentaerythritol acetal of azelaic semialdehyde, 13.81 g. (0.0293 mole) of the pentaerythritol acetal of the methyl azelaaldehydate of Example 1 was dissolved in a solution of potassium hydroxide (6.7 g., 0.12 mole in 225 ml. of 95 percent ethanol) and refluxed for 2 hours. The solution was cooled and neutralized to methyl orange with 5 N HCl. After recrystallization from methanol, there was obtained 12.7 g. (97 percent of theory) of a product melting at 151°–151.5° C.

*Analysis.*—Calcd. for $C_{23}H_{40}O_8$: C, 62.14; H, 9.07; acid. equiv. 222.3. Found: C, 62.38; H, 0.09; acid equiv. 222.5.

EXAMPLE 3

4.00 g. (0.008 mole) of the pentaerythritol acetal of methyl azelaaldehydate and 0.93 g. (0.008 mole) of hexamethylene diamine were heated for 2 hours at 290° C. with agitation provided by nitrogen that was admitted to the time via an inlet, followed by 2½ hours further heating at a pressure of 28 mm. Hg, yielding 3.65 g. of a white, brittle solid that melted at 160°–163° C. The product had an amine content of $6.6 \times 10^{-4}$ equivalent per gram and no titratable carboxyl. Its molecular weight of 3030 corresponded to about 6 repeating units. When heated at 260° C. with excess p-toluenesulfonic acid for 20 minutes, the resulting crosslinked poly(amide-acetal) was found to be a transparent, infusible, brownish solid showing remarkable adhesion to the sides of the glass reaction flask. A second preparation of the same linear polymer heated to 290° C. without a catalyst gelled only after 10 hours of heating.

EXAMPLE 4

A linear interpoly(amide-acetal) was prepared by heating 4.00 g. (0.008 mole) of the pentaerythritol acetal of methyl azelaaldehydate, 17.0 g. (0.008 mole) of dimethyl azelate, and 10.44 g. (0.090 mole) of hexamethylene diamine for 4 hours at 265°–270° C. with agitation by nitrogen admission and then for the same temperature for 4 additional hours at a pressure of 19 mm. Hg, yielding 26.3 g. of a white, brittle, opaque solid melting at 198°–199° C. End group analysis indicated an amine content of $5.27 \times 10^{-4}$ equivalent per g. and a carboxyl content of $0.24 \times 10^{-4}$ equivalent per g., corresponding to a molecular weight of 3,620 and about 12 repeating units.

Two grams of the above product was heated at 260° C. with 0.1 g. of p-toluenesulfonic acid under reduced pressure with agitation by nitrogen. Gelation occurred within 15 minutes to give a dark brown but transparent infusible solid that adhered strongly to the glass of the reaction flask and that swelled but did not dissolve in a 50 percent solution of phenol in tetrachloroethane. In the absence of a catalyst the poly(amide-acetal) did not gel even after 24 hours of heating at 270°–290° C. Also, a polyamide prepared as above but not containing any of the pentaerythritol acetal of methyl azelaaldehydate was found to melt at 214°–216° C. and to be soluble in the phenol-tetrachloroethane solution. This polyamide did not gel in the presence of p-toluenesulfonic acid even at 2 hours of heating at 290° C.

EXAMPLE 5

1.10 g. (0.0022 mole) of the pentaerythritol acetal of methyl azelaaldehydate, 4.56 g. (0.0216 mole) of dimethyl azelate, and 1.60 g. (0.0267 mole) of ethylene diamine were heated for 3.75 hours at 265°–270° C. under nitrogen and then for an additional 2 hours at a pressure of 25 mm. Hg to give a light tan, opaque solid melting at 232°–235° C. This interpoly(amide-acetal) by end group analysis was found to have an amine content of $5.56 \times 10^{-4}$ equivalent per gram and a carboxylic end-group content of $1.33 \times 10^{-4}$ equivalent per gram, corresponding to a molecular weight of 2,900 and to 12 repeating units.

EXAMPLE 6

In an alkali washed, modified, 50-milliliter distilling flask was placed pentaerythritol acetal of methyl azelaaldehydate (1 gram, 0.002 mole), dimethyl terephthalate (2.94 grams, 0.018 mole) and hexamethylene diamine (2.55 grams, 0.022 mole). The reactants were heated at 260° C. in an open system under a nitrogen atmosphere. The reaction mixture set up after 15 minutes of heating. Heating was continued until a total of 4 hours had elapsed. The product was light yellow in color and stuck slightly to the reaction flask. The product melted at ignition temperature and swelled, but did not dissolve, in 50 percent phenol/tetrachloroethane.

EXAMPLE 7.—CROSS LINKING OF A POLY(AMIDE-ACETAL)

Into each of five 25 x 150 mm. test tubes marked A–E was placed 2.0 grams of the poly(amide-acetal) containing 10 percent of the pentaerythritol acetal of azelaic semialdehyde. The tubes which were fitted with a nitrogen ebullator and a vacuum takeoff were heated in an oil bath at 285°–295°.

*Tube A.*—No catalyst was used in this tube. Heating was discontinued after 4 hours. The resulting solid melted at 210°–214° and dissolved in 50 percent phenol-tetrachloroethane after setting over night. The solid adhered only slightly to the reaction tube.

*Tube B.*—To this tube was added 0.01 gram of zinc oxide. After a period of 1½ hours the product had gelled. It adhered strongly to the glass and melted near its ignition temperature. After setting for several days in 50 percent phenol/tetrachloroethane it had swelled but had not dissolved.

*Tube C.*—Into tube C was placed 0.01 gram of zinc acetate. After 1½ hours the sample had gelled. It adhered strongly to the tube and melted at near ignition temperature. It swelled but did not dissolve in 50 percent phenol/tetrachloroethane.

*Tube D.*—The catalyst in tube D was 0.01 gram of litharge. After 2 hours the sample had gelled. The product melted at near its ignition temperature and adhered strongly to reaction flask. It also was insoluble in 50 percent phenol/tetrachloroethane.

*Tube E.*—Tube E contained 0.01 gram of magnesium oxide as catalyst. Heating was discontinued after 3 hours. The product swelled but did not dissolve in 50 percent phenol/tetrachloroethane. It adhered strongly to tube and melted at near its ignition temperature.

Products B–E all swelled to twice their volume upon gellation. They were all light tan in color.

Data is presented in Table I showing the effects of substituting various proportions of dimethyl azelate for equivalent proportions of the pentaerythritol acetal of methyl azelaaldehydate in reactions with hexemethylene diamine.

Table I.—Interpoly(amide-acetals) from dimethyl azelate (a), 3,9 - bis(7 - carbomethoxyheptyl) - 2,4,8,10 - tetra-oxaspiro[5,5]undecane (b) and hexamethylene diamine

| Exp. No. | Ratio of dibasic esters, a/b | Reaction conditions | | | Melting range, °C. | MW/n [1] | Equivalents per g.×10[4] | | Degree of polymerization | Limiting viscosity number [2] |
|---|---|---|---|---|---|---|---|---|---|---|
| | | Pressure | Time, hr. | Temperature, °C. | | | −NH$_2$ | −COOR | | |
| 1 [3] | 100/0 | Autogenous / 30 mm. Hg | 2 | 210-215 | 215-217 | 5,195/19 | 0.0889 | 3.76 | 12.6 | 43.0 |
| 2 | 95/5 | Autogenous / 30 mm. Hg | 2 / 2 | 200 / 200-220 | 200-202 | 4,940/17 | 2.6 | 1.45 | 40 | 21.2 |
| 3 | 90/10 | Atmospheric | 8 | 270 | 193-196 | 6,300/21 | 0.148 | 3.16 | 33 | 16.8 |
| 3 [3] | 90/10 | Atmospheric / 19 mm. Hg | 4 / 4 | 265-270 / 270 | 198-199 | 3,620/12 | 5.27 | 0.24 | | |
| 4 | 80/20 | Autogenous / 30 mm. Hg | 2 / 2 | 210-235 / 230-235 | 185-187 | 5,260/17 | 1.99 | 1.81 | 26 | 11.3 |
| 5 | 0/100 | Autogenous / 28 mm. Hg | 2 / 2.5 | 290 / 290 | 160-163 | 3,030/6 | 6.6 | 0 | 9.9 | 6.0 |

[1] Average number molecular weights as determined by end-group analyses, and the number of repeating units.
[2] Viscosities measured in a solution of 50% phenol in tetrachloroethane.
[3] Produced from the azelaic ammonium salt.

Table II shows the crosslinking effect of various acidic catalysts on the specific linear interpoly(amide-acetals) of Table I (identified by experiment number).

Table II.—Effect of catalysts on crosslinking

| Poly(amide-acetal) | | Catalyst | | Heating Period | | Degree of crosslinking [1] |
|---|---|---|---|---|---|---|
| Exp. No. | Mole percent of dimethyl acelate | Compound | Wt. percent | Temp., °C. | Time, hrs. | |
| 5 | 100 | p-CH$_3$C$_6$H$_4$SO$_3$H | 3.3 | 260 | 0.25 | Complete. |
| 4 | 20 | p-CH$_2$C$_6$H$_4$SO$_3$H | 18 | 250 | 0.5 | Do. |
| 3 | 10 | p-CH$_3$C$_6$H$_4$SO$_3$H | 18 | 270 | 0.5 | Do. |
| 3 | 10 | ZnO | 0.5 | 285-295 | 2 | Do. |
| 3 | 10 | Zn(OAc)$_2$ | 0.5 | 285-295 | 2 | Do. |
| 3 | 10 | PbO | 0.5 | 285-295 | 2.5 | Do. |
| 3 | 10 | Sb$_2$O$_3$ | 0.5 | 285-295 | 2.5 | Partial. |
| 3 | 10 | MgO | 0.5 | 285-295 | 2.5 | Complete. |
| 3 | 10 | None | | 285-295 | 4 | Partial. |
| 2 | 5 | p-CH$_3$C$_6$H$_4$SO$_3$H | 0.2 | 280 | 2 | Do. |
| 2 | | MgO | 0.5 | 285-295 | 2 | Complete. |
| 2 | | ZnO | 0.5 | 285-295 | 2.25 | Partial. |
| 2 | | Zn(OAc)$_2$ | 0.5 | 285-295 | 2.25 | Do. |
| 2 | | Sb$_2$O$_3$ | 0.5 | 285-295 | 4 | Do. |
| 2 | | PbO | 0.5 | 285-295 | 4 | Do. |

[1] Degree of crosslinking defined qualitatively as follows:
Partial: Polymer swells or gradually dissolves; does not adhere strongly to glass.
Complete: Polymer is infusible, insoluble, transparent; does adhere strongly to glass Having fully disclosed my invention, I claim:

1. Transparent, infusible, completely crosslinked polyamides selected from the group consisting of completely crosslinked poly(amide-acetals) and completely crosslinked interpoly(amide-acetals) that are further characterized by molecular weights of about 2,900 to about 6,300, by being insoluble in a 50 percent solution of phenol in tetrachloroethane, and by being very adherent to glass, said completely crosslinked interpoly(amide-acetals) being the products obtained by heating a hereinafter defined linear interpoly(amide-acetal) polymer at 260°-295° C. under a reduced pressure of nitrogen and in the presence of at least 0.5 percent by weight of the polymer of a crosslinking catalyst selected from the group consisting of p-toluenesulfonic acid, zinc acetate, zinc oxide, lead oxide, antimony oxide, and magnesium oxide, said linear interpoly(amide-acetal) polymers being the intermediates obtained by previously condensing a pentaerythritol acetal selected from the group consisting of the pentaerythritol acetal of methyl azelaaldehydate and the pentaerythritol acetal of azelaic semialdehyde with (a) about 1 to about 12 molar equivalents of an alkylene diamine selected from the group consisting of ethylene diamine and hexamethylene diamine and (b) from zero to about 10 molar equivalents of a dicarboxylic ester selected from the group consisting of dimethyl azelate and dimethyl terephthalate, the condensation reaction having been conducted under distillation conditions at about 260°-290° C. for about 2 to 4 hours in the presence of bubbled inert gas to remove the alcohol of reaction and then for at least another 2 hours under subatmospheric pressure.

2. A fully crosslinked poly(amide-acetal) according to claim 1 wherein the pentaerythritol acetal is that of methyl azelaaldehydate, the alkylene diamine is hexamethylene diamine, and the catalyst is magnesium oxide.

3. A fully crosslinked interpoly(amide-acetal) according to claim 1 wherein the pentaerythritol acetal is that of methyl azelaaldehydate, the dicarboxylic acid ester is dimethyl azelate that has reacted in the amount of about 10 molar equivalents relative to the amount of pentaerythritol acetal of methyl azelaaldehydate, the alkylene diamine is hexamethylene diamine that has been reacted in the amount of about 11 molar equivalents relative to the amount of said pentaerythritol acetal, and wherein the crosslinking catalyst is lead oxide.

4. A fully crosslinked interpoly(amide-acetal) according to claim 1 wherein the pentaerythritol acetal is that of methyl azelaaldehydate, the dicarboxylic acid ester is dimethyl terephthalate that has been reacted in the amount of about 9 molar equivalents relative to the amount of pentaerythritol acetal of methyl azelaaldehydate, the alkylene diamine is hexamethylene diamine that has been reacted in the amount of about 11 molar equivalents relative to the amount of said pentaerythritol acetal, and wherein the crosslinking catalst is p-toluenesulfonic acid.

References Cited by the Examiner
UNITED STATES PATENTS

| | | | |
|---|---|---|---|
| 1,389,662 | 11/1945 | Fischer et al. | 260—78 |
| 2,945,008 | 7/1960 | Caldwell et al. | 260—75 |
| 3,161,619 | 12/1964 | Rice et al. | 260—78 |

WILLIAM H. SHORT, *Primary Examiner.*

HAROLD N. BURNSTEIN, JOSEPH R. LIBERMAN,
*Examiners.*